(12) United States Patent
Chochua

(10) Patent No.: US 8,286,969 B2
(45) Date of Patent: Oct. 16, 2012

(54) FLOATING FLUID FILM SEALS

(75) Inventor: Gocha Chochua, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 742 days.

(21) Appl. No.: 12/299,051

(22) PCT Filed: Apr. 5, 2007

(86) PCT No.: PCT/US2007/066057
§ 371 (c)(1),
(2), (4) Date: Nov. 19, 2008

(87) PCT Pub. No.: WO2007/118142
PCT Pub. Date: Oct. 18, 2007

(65) Prior Publication Data
US 2009/0224484 A1 Sep. 10, 2009

Related U.S. Application Data

(60) Provisional application No. 60/790,496, filed on Apr. 6, 2006.

(51) Int. Cl.
*F16J 15/447* (2006.01)
*F16J 15/40* (2006.01)

(52) U.S. Cl. ......... 277/418; 277/420; 277/424; 277/431

(58) Field of Classification Search .................. 277/417, 277/418, 419, 420, 424, 431
See application file for complete search history.

(56) References Cited

U.S. PATENT DOCUMENTS

| | | | | | |
|---|---|---|---|---|---|
| 2,956,825 | A | * | 10/1960 | Delafield et al. | 277/431 |
| 4,305,592 | A | * | 12/1981 | Peterson | 277/430 |
| 5,553,232 | A | * | 9/1996 | Wilhite et al. | 714/6.1 |
| 5,593,232 | A | * | 1/1997 | Maier | 384/119 |
| 5,890,873 | A | * | 4/1999 | Willey | 415/173.5 |
| 6,311,958 | B1 | * | 11/2001 | Stanek | 261/30 |
| 2003/0178783 | A1 | * | 9/2003 | Langston et al. | 277/423 |

* cited by examiner

*Primary Examiner* — Vishal Patel
(74) *Attorney, Agent, or Firm* — Edmonds & Nolte, PC

(57) ABSTRACT

A seal ring for a rotatable shaft in a turbo machine includes a seal body configured for disposing around the shaft wherein a radial gap is defined between an inner surface of the seal body and the shaft. An upstream surface defined by the seal body extends from the inner surface, and an annular obstruction extends from the upstream surface of the seal body, wherein the obstruction is spaced away from the inner surface.

9 Claims, 8 Drawing Sheets

FLOATING FLUID FILM SEALS

CROSS-REFERENCE TO RELATED APPLICATION

This application claims priority from U.S. Provisional Patent Application No. 60/790,496, entitled "Obstruction Device for Floating Fluid Film Seals," filed Apr. 6, 2006 by Gocha Chochua.

BACKGROUND

The present invention relates to sealing improvements in turbomachinery. More specifically, the invention relates to a floating fluid film sealing configuration with an obstruction.

Floating fluid film seals are designed to force a seal fluid, such as oil, into a machine in order to prevent process fluid from escaping from a pressure casing down a shaft. Seal fluid exiting the seal contacts process fluid and becomes contaminated, or "sour." The sour oil is drained away from the seal for reclamation or disposal. Current seals result in a negative pressure differential at an entrance to the seal, which thereby creates negative flow across the seal resulting in contamination of the seal fluid, or "sweet" oil. Further, seals have an oil flow swirl ratio, which may be defined as a ratio of local angular velocity to shaft angular velocity. Current seals often result in a higher swirl ratio at the entrance to the seal, which creates a pressure drop exceeding the supplied differential pressure. This can cause contamination of the sweet oil with the process gas. Such discrepancies result in a secondary flow within the seal fluid that is directed towards the inner seal, which also results in a greater pressure drop adjacent the seal entrance.

SUMMARY

In one embodiment, the invention provides a seal ring for a rotatable shaft in a turbo machine. The seal ring includes a seal body configured for disposing around the shaft wherein a radial gap is defined between an inner surface of the seal body and the shaft. An upstream surface defined by the seal body extends from the inner surface and an annular obstruction extends from the upstream surface of the seal body, wherein the obstruction is spaced away from the inner surface.

In another embodiment the invention provides a seal ring for a rotatable shaft in a turbo machine. The seal ring includes a seal body configured for disposing around the shaft wherein a radial gap is defined between an inner surface of the seal body and the shaft. An upstream surface defined by the seal body extends from the inner surface, wherein the upstream surface at least partially defines a seal fluid passageway that fluidly communicates with the radial gap. An annular obstruction extends from the upstream surface of the seal body, wherein the obstruction maintains a positive differential pressure in the seal fluid passageway proximate the radial gap.

In yet another embodiment, the invention provides a sealing system for a rotatable shaft in a turbo machine. The sealing system includes a first seal ring configured for disposing around the shaft wherein a radial gap is defined between an inner surface of the first seal ring and the shaft, and a second seal ring configured for disposing around the shaft wherein the radial gap is further defined between an inner surface of the second seal ring and the shaft. The second seal ring is positioned upstream from the first seal ring. A seal fluid passageway defined between the first seal ring and the second seal ring fluidly communicates with the radial gap. The first seal ring includes an upstream surface extending from the inner surface of the first seal ring, wherein the upstream surface at least partially defines the seal fluid passageway, and an annular obstruction extending from the upstream surface of the seal body into the seal fluid passageway, wherein the obstruction is spaced apart from the inner surface of the first seal ring.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
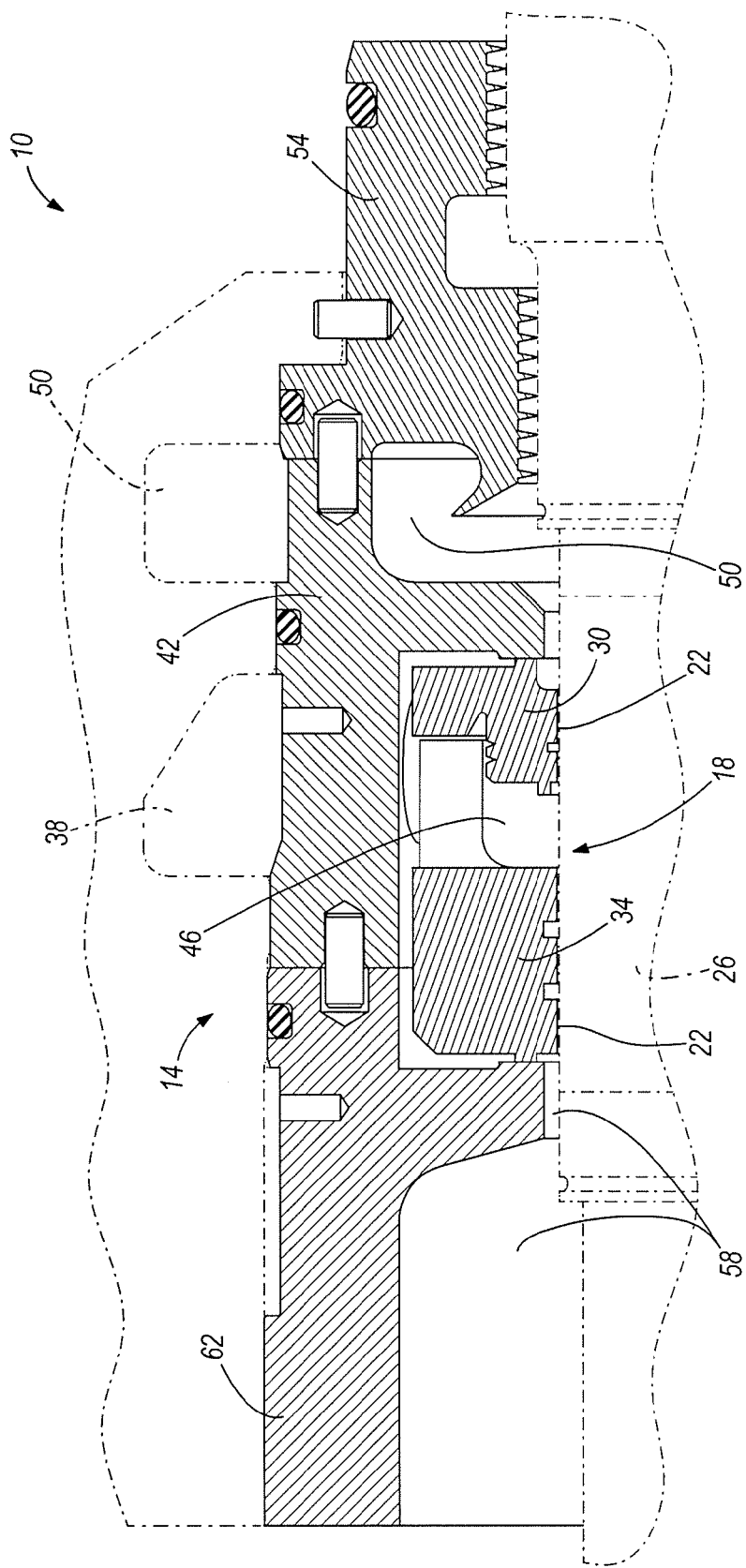
FIG. 1 is a cross-sectional view of turbo machine including a seal configuration according to one embodiment of the invention

FIG. 1 illustrates a turbo machine 10 including a seal configuration 14 according to one embodiment of the invention. A floating fluid film seal 18 is used in a machine such as a compressor, a gas turbine, etc., to seal a radial gap 22 between moving parts in order to inhibit leaking of a process fluid (in some cases air). The floating fluid film seal 18 is configured to force a seal fluid, such as oil, into the machine 10 in order to inhibit the process fluid from escaping from a pressure casing down a machine shaft 26. Referring to FIG. 1, the floating fluid film seal 18 includes an inner seal ring 30 (FIGS. 2 and 3) and an outer seal ring 34 both of which radially disposed about the machine shaft 26. The seal rings 30, 34 have a tight clearance with the shaft 26, with the inner seal ring 30 having a tighter clearance than the outer seal ring 34; however, the radial gap 22 is formed between the seal rings 30, 34 and the shaft 26 to facilitate fluid flow through the seal configuration 14.

Seal fluid is supplied to the machine 10 through a seal fluid supply port 38, and the seal fluid passes through an inner seal housing 42 along a seal fluid passageway 46 to the radial gap 22. Seal fluid exiting the inner seal ring 30 comes in contact with process fluid and becomes contaminated, or "sour." The sour fluid is directed between the shaft and the inner seal ring 30, and is drained away from the seal 18 to a sour fluid drain (not shown) for reclamation or disposal. In one embodiment, the sour fluid drain is defined by the inner seal housing 42 and an inner labyrinth seal 54. Uncontaminated, or "sweet," fluid is directed between the shaft 26 and the outer seal ring 34 to a sweet fluid drain (not shown), which is at least partially defined by an outer seal housing 62.

Area 50 of the seal configuration 14 contains a high pressure process gas for the turbo machine 10 and an area 58 in communication with the ambient atmosphere. The seal 18 isolates process gas from the high pressure region 50 to reach the atmospheric region 58. Seal fluid is supplied to the seal fluid passageway at a pressure of 5 psi above the pressure of region 50. In some prior art configurations, there is a high differential pressure, and hence leakage, across the outer seal ring 34; therefore, the seal fluid does not get very hot by friction or contaminated and this "sweet" fluid is pumped back to the seal fluid loop. Likewise, a small amount of seal fluid leaks through the inner ring 30, whereby the seal fluid gets very hot and comes in contact with the process gas. The inner seal ring 30 of the present invention helps to reduce this leakage.

In one embodiment, a relatively low differential pressure is maintained across the inner seal ring, 30 e.g., about 5 psi. The differential pressure is normally maintained by elevating a seal fluid tank (not shown) above a centerline of the shaft 26 and connecting the process fluid reference pressure to a top of the tank.

Figure 2:
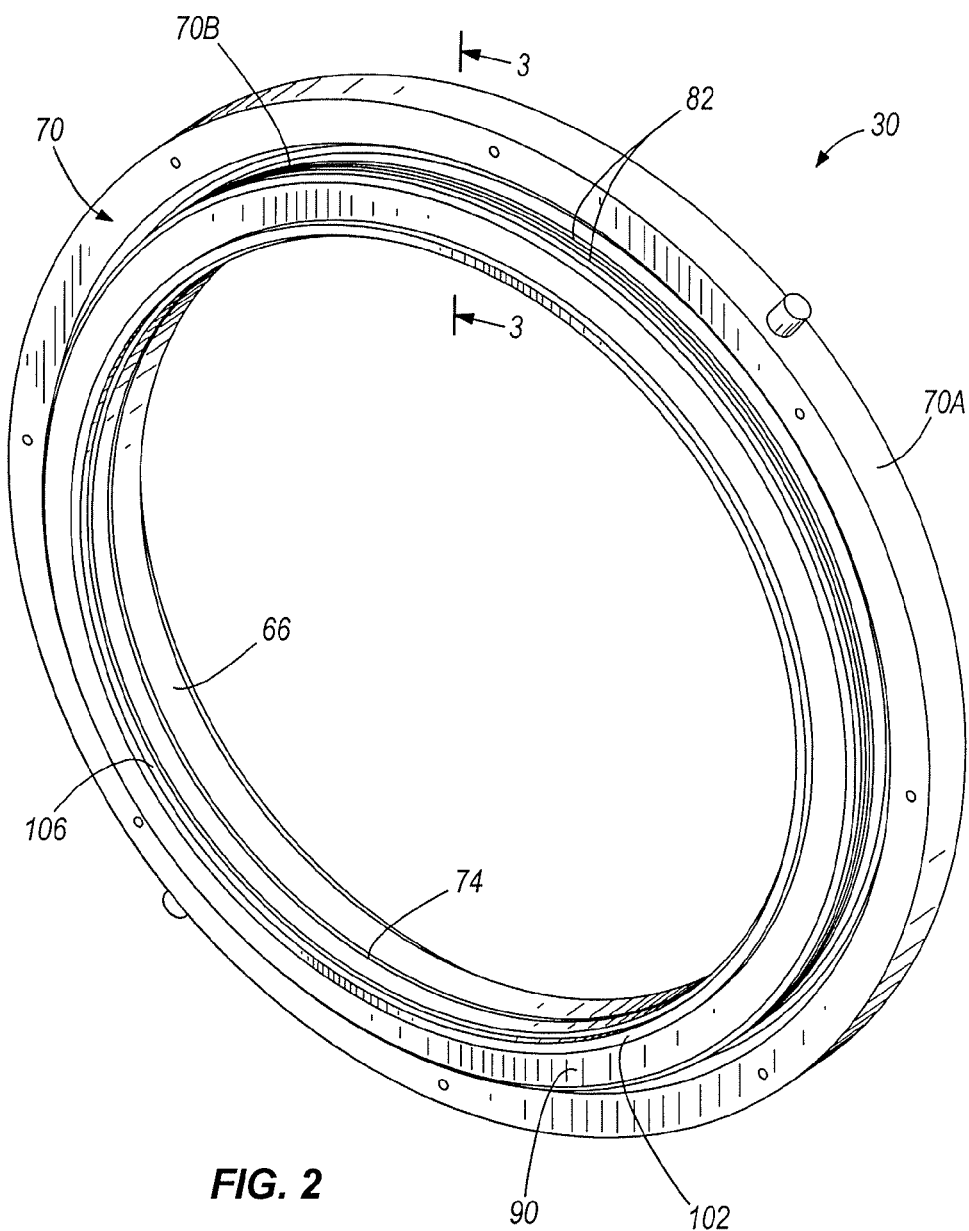
FIG. 2 is a perspective view of a fluid film seal used in the seal configuration shown in FIG. 1.
Figure 3:
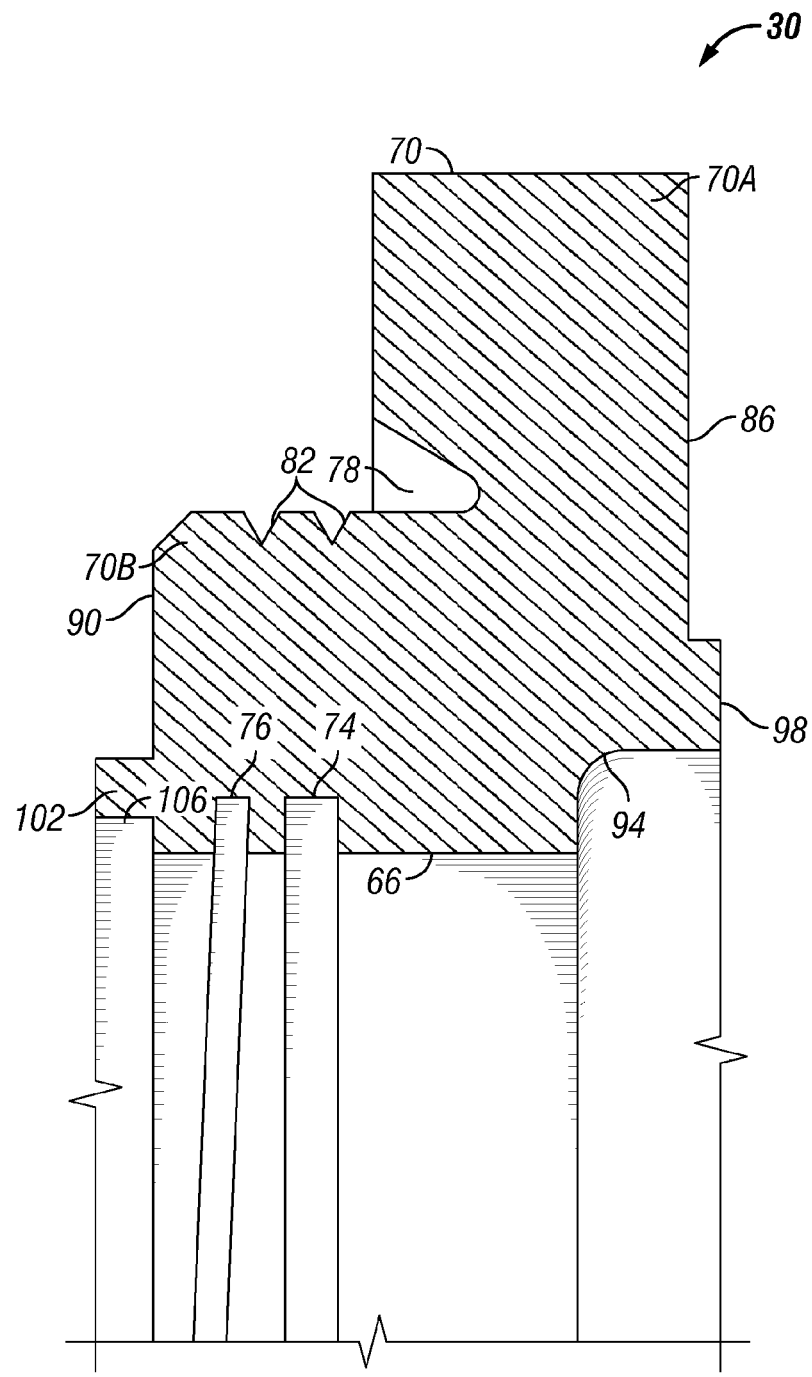
FIG. 3 is a cross-sectional view of the fluid film seal taken along line 3-3 in FIG. 2.

FIGS. 2 and 3 illustrate the inner seal ring 30 according to one embodiment of the invention. The inner seal ring 30 includes an inner surface 66 defining an inner diameter of the ring 30, which interfaces with an outer diameter of the shaft 26 (shown in FIG. 1), and an outer surface 70 opposite the inner surface 66. The inner surface 66 of the seal ring 30 includes a groove 74 (e.g., an annular or axisymetric groove) that reduces seal fluid leakage by creating a pressure drop at an entrance region 110. The groove 74 further defines the inner surface into an inner land 66A and an outer land 66B, which contains at least one windback groove 76 for pumping seal fluid back to the seal fluid passageway 46. In the illustrated embodiment, the groove 76 has a generally helical configuration.

The outer surface 70 defines an outer diameter of the ring 30, and includes a first portion 70A having a first diameter. A second portion 70B, positioned upstream (i.e., to the left as viewed in FIG. 3) of the first portion 70A, has a second diameter that is less than the first diameter. The first portion 70A includes an angled cut-out 78 proximate the second portion to define an annular groove. Further, the second portion 70B defines a series of annular grooves 82 (e.g., two grooves). Grooves 78, 82 facilitate cooling of the inner seal ring 30.

The inner seal ring 30 also includes a downstream surface 86 and an upstream surface 90, which is positioned opposite the outer seal ring 34 and adjacent the seal fluid supply passageway 46. The downstream surface 86 includes a cut-out 94, or notch, proximate the inner face 66. The notch 94 provides an exit region from the inner seal ring 30 to the sour fluid drain 50, wherein the notch 94 partially defines the sour fluid drain 50. A portion of the downstream surface 86 provides an interface 98 between the inner seal ring 30 and the inner seal housing 42.

The upstream surface 90 of the inner seal ring 30 includes an annular obstruction 102, or rib, spaced away from the inner surface 66 of the ring 30. The obstruction 102 and the inner surface 66 define a notch 106 therebetween, which partially defines an entrance region 110 (FIGS. 5 and 7) to the radial gap 22 between the inner seal ring 30 and the shaft 26 at the seal fluid supply passageway 46.

Figure 4:
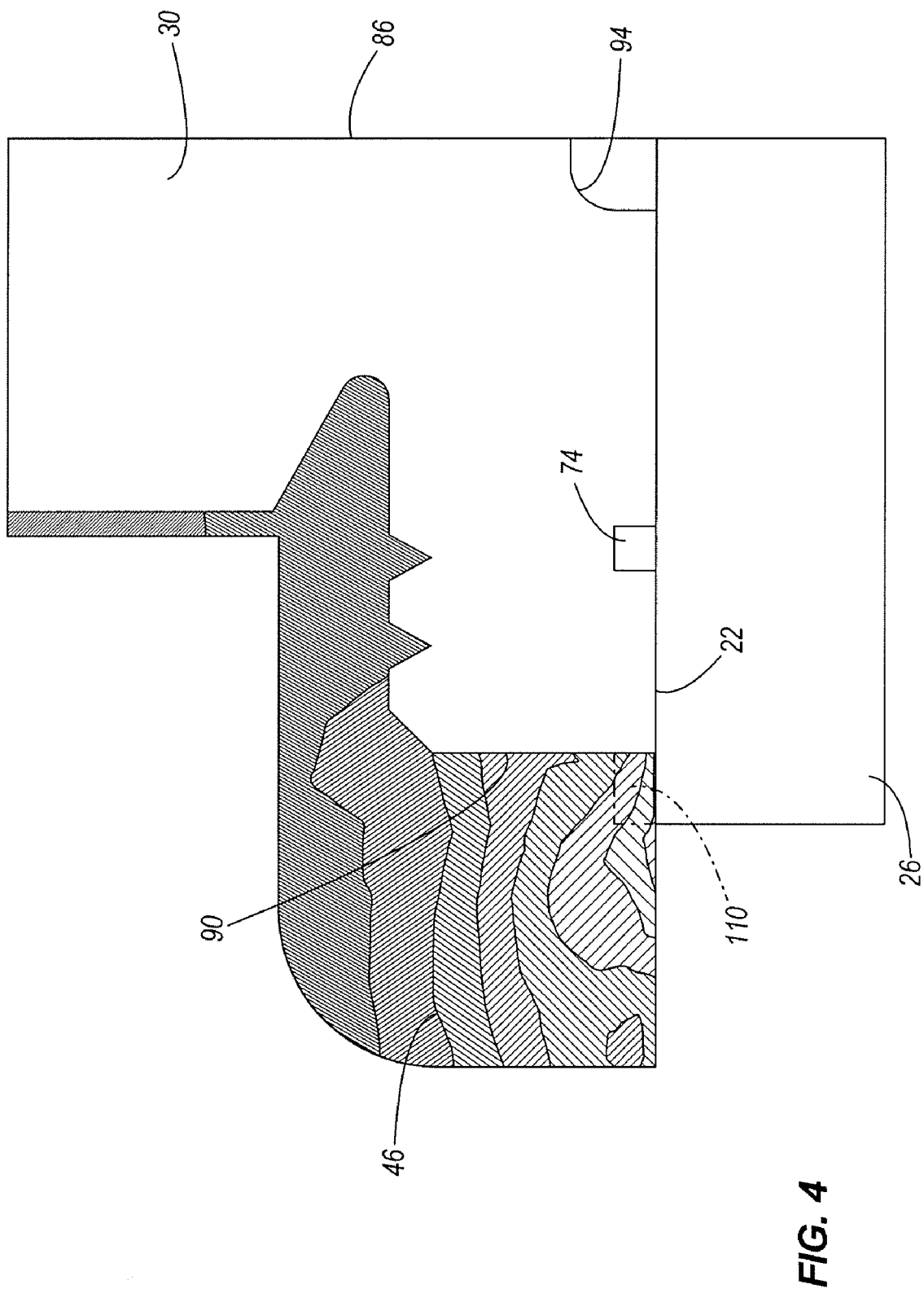
FIG. 4 is schematic view of a fluid film seal pressure distribution according to a prior art configuration.

In order to reduce the amount of sour seal fluid leakage from the seal 18, the inner seal ring 30 has a tight clearance with the shaft 26. To further reduce sour seal fluid leakage, the groove 74 formed in the inner surface 66 of the inner seal ring 30 pumps the seal fluid away from the sweet seal fluid. However, in some cases, a reverse flow of seal fluid occurs across the inner seal ring 30 resulting in contamination of the sweet seal fluid. An example of the reverse flow of seal fluid is shown in FIG. 4, whereby flow is to the left. Instead of seal fluid flowing from the entrance region 110 of the inner seal ring 30 to the radial gap 22, opposite flow occurs.

FIG. 4 illustrates a fluid film seal pressure distribution according to a prior art configuration of an inner seal ring 30 (Like reference numerals are used for like structure to facilitate discussion). In FIG. 4, seal fluid swirl occurs in the seal fluid passageway 46 between the inner seal ring 30 and the outer seal ring due to shaft rotation, which creates a centrifugal acceleration between the inner seal ring 30 and the outer seal ring. Computational Fluid Dynamic (CFD) analysis shows that in some instances, for example, high rotational speeds and large shaft diameters, the centrifugal acceleration is large enough to overcome the differential seal pressure. In addition to this case stall-type pressure oscillations are sometimes observed at the entrance region 110.

Referring to FIGS. 1, 3, 5 and 7, the inner seal ring 30 includes the annular obstruction 102, which isolates the entrance region 110 of the inner seal ring 30 from swirl originated at the shaft 26. In the illustrated embodiment, the obstruction 102 is positioned proximate the entrance region 110 of the inner seal ring 30 and is spaced away from the inner surface 66 of the seal ring 30. Further, the obstruction 102 is integrally formed with the inner seal ring 30, which provides for convenient manufacturing and improved cooling of the seal ring 30 by including additional surface area to the high circumferential velocity region of the seal fluid. It should be readily apparent to those of skill in the art that in a further embodiment, more than one annular obstruction 102 may be formed on the inner seal ring 30, and the obstruction 102 may be coupled to the upstream surface 90 of the inner seal ring 30.

Figure 5:
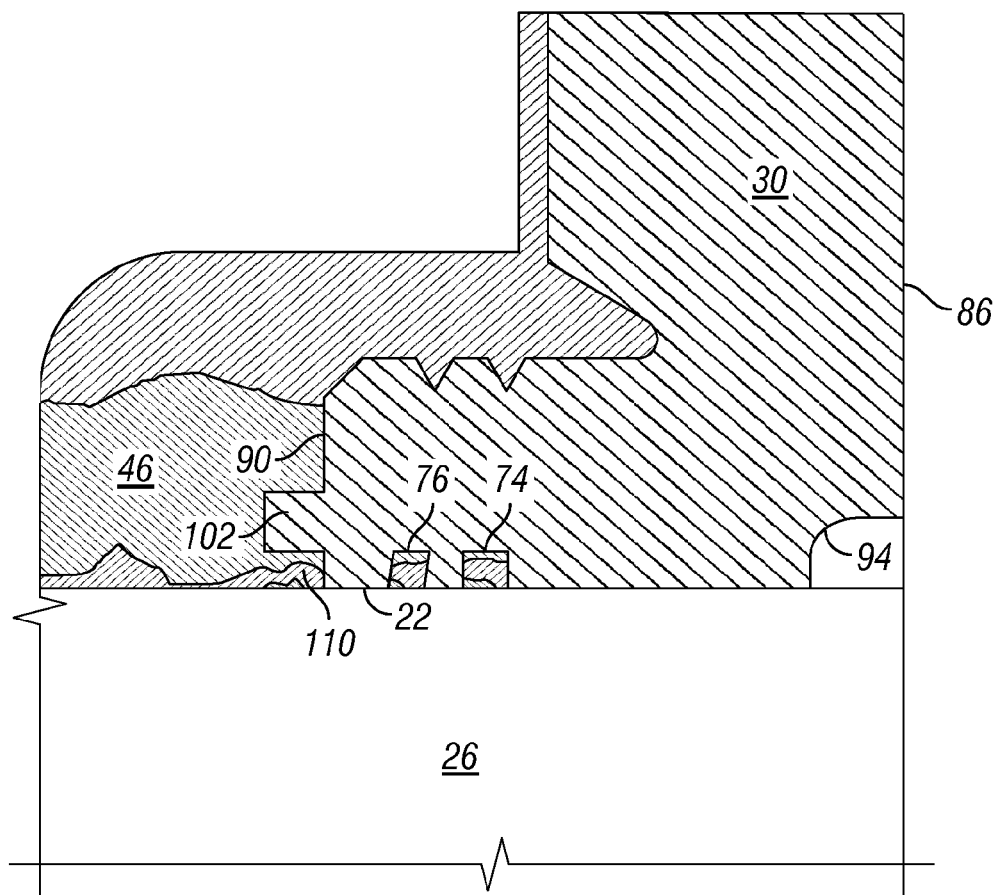
FIG. 5 is a schematic view of a fluid film seal pressure distribution for a seal with an obstruction device according to one embodiment of the invention.

FIGS. 4 and 5 illustrate differential pressure distributions of the seal fluid within the seal fluid passageway 46 without an obstruction and with the obstruction 102, respectively, on the upstream surface 90 of inner seal ring 30. Denser hatching indicates higher fluid pressure within the seal fluid passage way 46, for example, the densest area has about 4.5 psi to about 5 psi, and the least dense area has at most 0.5 psi. Referring to FIG. 4, without an obstruction the differential pressure becomes negative with a low pressure at the entrance region 110 of the inner seal ring 30. The negative pressure differential results in reversed seal fluid flow across the seal fluid passageway, and thereby, contamination of the sweet seal fluid. Referring to FIG. 5, the obstruction 102 creates a positive differential pressure within the seal fluid passageway, and seal fluid flows from the entrance region 110 to the radial gap 22 (i.e., from left to right in FIG. 5). That is, the obstruction 102 causes increased seal fluid pressure at the entrance region 110, which makes reverse flow through the seal more difficult.

Figure 6:
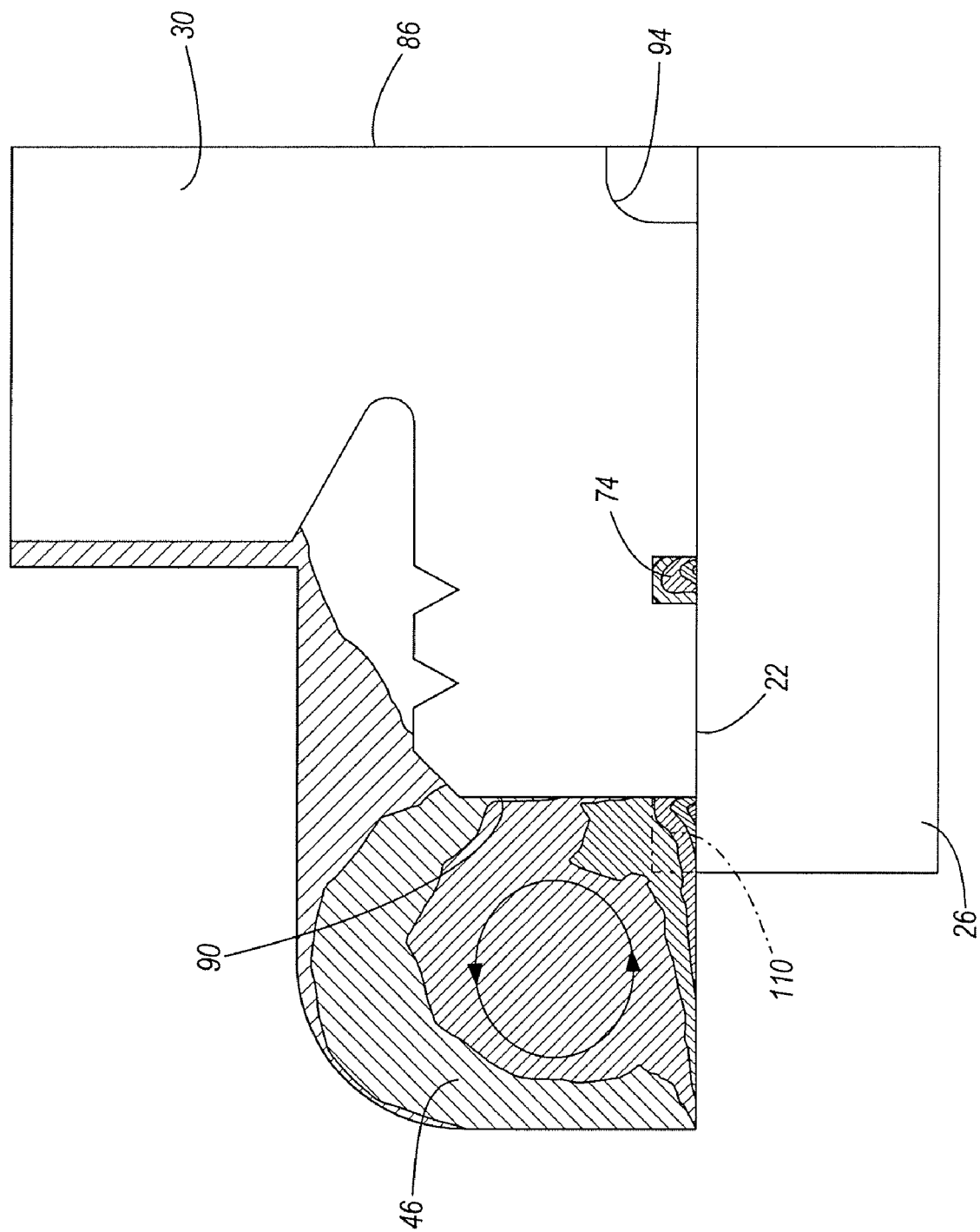
FIG. 6 is a schematic view of a fluid film seal swirl ratio distribution according to the prior art configuration shown in FIG. 4.
Figure 7:
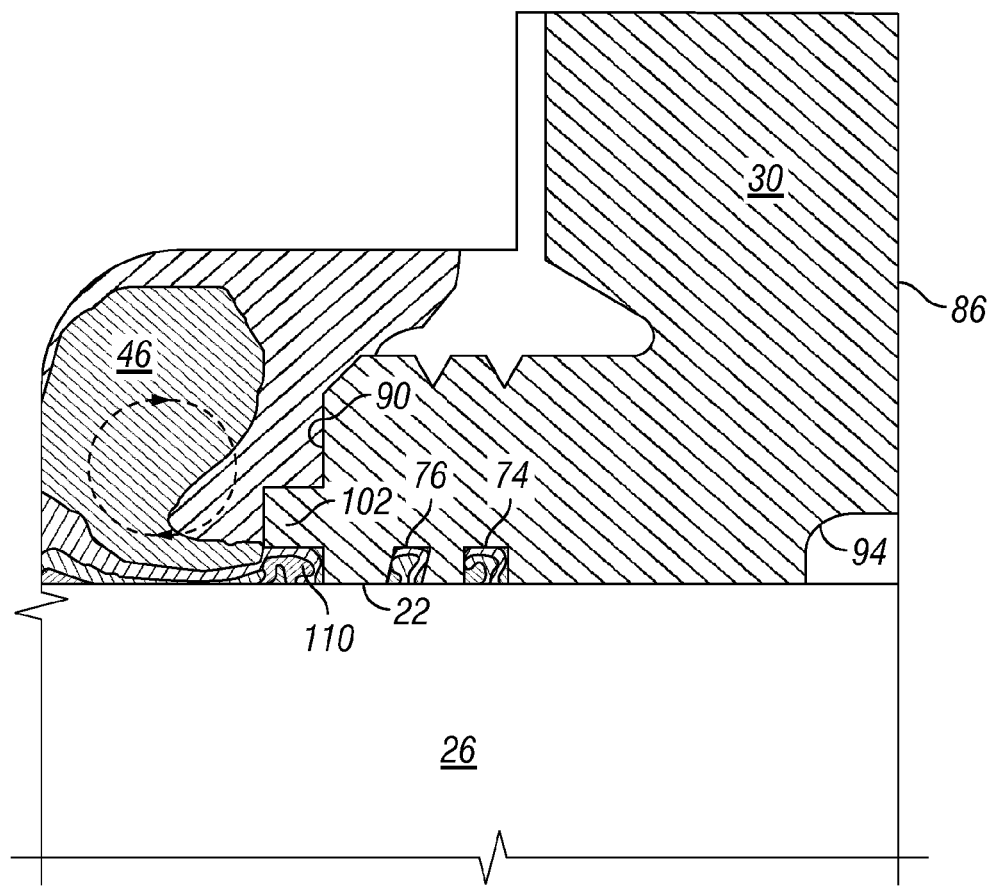
FIG. 7 is a schematic view of a fluid film seal swirl ratio distribution for the seal with the obstruction device shown in FIG. 5.

FIGS. 6 and 7 illustrate a fluid swirl ratio distribution for the inner seal ring 30 without an obstruction and with the obstruction 102, respectively, on the upstream surface 90 of the inner seal ring 30. Swirl ratio is defined as a ratio of local angular velocity to angular velocity of the machine shaft 26.

For example, when the seal fluid is rotating in unison with the shaft 26, the swirl ratio has a value of 1.0. Denser hatching indicates higher swirl ratio within the seal fluid passage way 46 than areas having less dense hatching.

Generally, the swirl ratio is maximized near the entrance region 110 of the inner seal ring 30 and decreases at points spaced from the entrance region 110, with the swirl ratio being higher at points radially closer to the shaft 26. There is a drastic increase in the swirl ratio just radially outward of the entrance region 110 adjacent the inner seal ring 30 as compared to the swirl ratio at points further from the inner seal ring 30. The flow in the entrance region 110 is spinning with the shaft 26 in the circumferential direction. As a result of an interaction with adjacent stationary components and seal flows, a secondary motion is present in a meridional plane, so that the seal fluid flows along corkscrew path.

Referring to FIG. 6, when the inner seal ring 30 does not include an obstruction, the inner seal ring 30 has a secondary flow driven by a high outer seal leakage. The secondary flow is directed towards the inner seal ring 30 (i.e., the corkscrew flow has a counter-clockwise direction in FIG. 6). The secondary flow creates a maximum boundary layer thickness, and thereby a maximum swirl ratio at the entrance region 110.

Referring to FIG. 7, the inner seal ring 30 includes the obstruction 102 on the upstream surface 90. The obstruction 102 forces the secondary flow to have a reversed direction (i.e., the corkscrew flow has a clockwise direction in FIG. 7). As a result, the swirl ratio is decreased in the entrance region 110 and in the seal fluid passageway 46, which minimizes the pressure drop. The decreased swirl ratio and pressure drop reduces the possibility of process fluid escaping through the seal 18.

Figure 8:
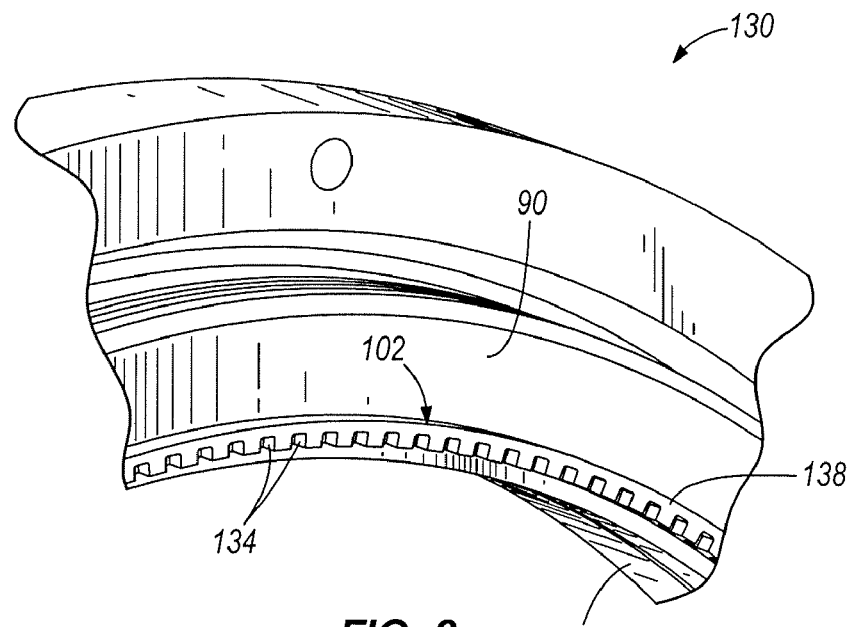
FIG. 8 is a perspective view of a portion of a fluid film seal according to another embodiment of the invention.

FIG. 8 is a perspective view of a portion of an inner seal ring 130 according to another embodiment of the invention. The inner seal ring 130 is similar to the inner seal ring 30 shown in FIGS. 1-3, and like structure will be identified by the same reference numerals. The inner seal ring 130 includes the annular obstruction 102 formed on the upstream surface 90 of the ring 130. The obstruction 102 includes radial slots 134 formed in an upstream surface 138 of the obstruction 102, which helps to further reduce swirl ratio. Each slot 134 extends radially outward relative to the inner surface 66 of the inner seal ring 130. In the illustrated embodiment, the slots 134 extend partially through a thickness of the obstruction 102, that is, a depth of the slot 134 is less than the thickness of the obstruction 102.

Figure 9:
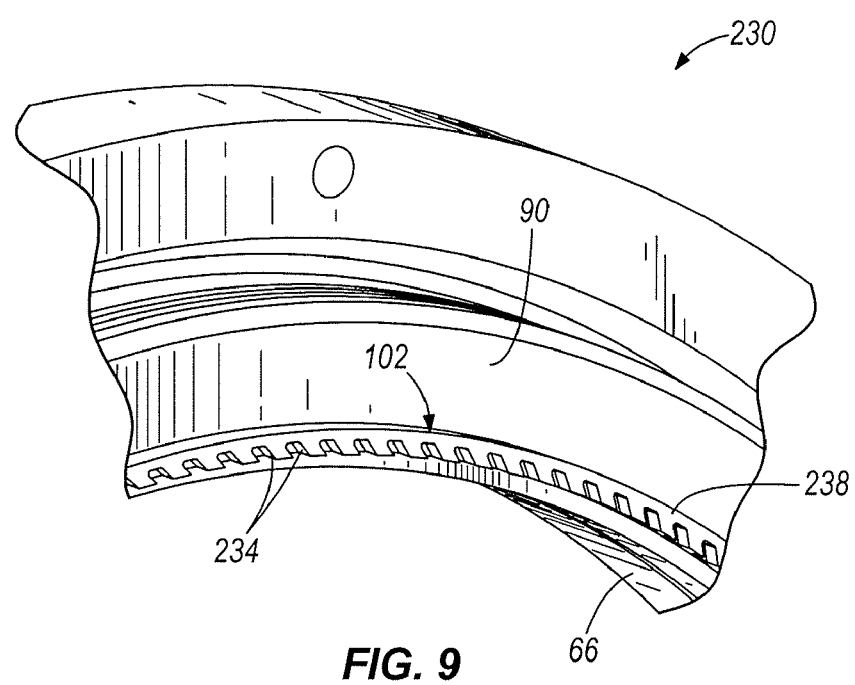
FIG. 9 is a perspective view of a portion of a fluid film seal according to yet another embodiment of the invention.

FIG. 9 is a perspective view of a portion of an inner seal ring 230 according to another embodiment of the invention. The inner seal ring 230 is similar to the inner seal ring 30 shown in FIGS. 1-3, and like structure will be identified by the same reference numerals. The inner seal ring 230 includes the annular obstruction 102 formed on the upstream surface 90 of the ring 230. The obstruction 102 includes angled slots 234 formed in an upstream surface 238 of the obstruction 102, which helps to further reduce swirl ratio. Each slot 234 is angled relative to the inner surface 66 of the inner seal ring 230. In the illustrated embodiment, the slots 234 extend partially through a thickness of the obstruction 102, that is, a depth of the slot 234 is less than the thickness of the obstruction 102.

In the illustrated embodiments, an obstruction on an upstream surface of the inner seal ring reduces pressure drop at the entrance region of the inner seal ring, and thereby prevents the possibility of process fluid escaping through the seal. Further, the obstruction reduces unsteady time variant oscillations of fluid pressure (i.e., the differential pressure) at the entrance region of the inner seal ring.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined generally herein and in the appended provisional claims.

What is claimed is:

1. A seal ring for a rotatable shaft in a turbo machine, the seal ring comprising:
    a seal body configured for disposing around the rotatable shalt, wherein a radial gap is defined between an inner surface of the seal body and the rotatable shaft,
    the inner surface of the seal body having an annular groove and an annular helical groove;
    an upstream surface defined by the seal body and extending from the inner surface;
    an annular obstruction extending from the upstream surface of the seal body, wherein the annular obstruction is spaced away from the inner surface; and
    a plurality of slots formed in an upstream face of the annular obstruction, wherein the plurality of slots are angled relative to the inner surface of the seal body, and a depth of each slot of the plurality of slots is less than a thickness of the annular obstruction.

2. The seal ring of claim 1, wherein the annular obstruction is an annular rib.

3. A seal ring for a rotatable shaft in a turbo machine, the seal ring comprising:
    a seal body configured for disposing around the rotatable shalt, wherein a radial gap is defined between an inner surface of the seal body and the rotatable shaft,
    the inner surface of the seal body having an annular groove and an annular helical groove;
    an upstream surface defined by the seal body and extending from the inner surface, wherein the upstream surface at least partially defines a seal fluid passageway that fluidly communicates with the radial gap;
    an annular obstruction extending from the upstream surface of the seal body, wherein the annular obstruction maintains a positive differential pressure in the seal fluid passageway proximate the radial gap; and
    a plurality of slots formed in an upstream face of the annular obstruction, wherein the plurality of slots are angled relative to the inner surface of the seal body, and a depth of each slot of the plurality of slots is less than a thickness of the annular obstruction.

4. The seal ring of claim 3, wherein the annular obstruction is spaced apart from the inner surface of the seal body.

5. The seal ring of claim 3, wherein the annular obstruction is an annular rib.

6. A sealing system for a rotatable shaft in a turbo machine, the sealing system comprising:
    a first seal ring configured for disposing around the rotatable shaft, wherein a radial gap is defined between an inner surface of the first seal ring and the rotatable shaft,
    the inner surface of the seal body having an annular groove and an annular helical groove;
    a second seal ring configured for disposing around the rotatable shaft, wherein the radial gap is further defined between an inner surface of the second seal ring and the rotatable shaft, and further wherein the second seal ring is positioned upstream from the first seal ring; and
    a seal fluid passageway defined between the first seal ring and the second seal ring, wherein the seal fluid passageway fluidly communicates with the radial gap, and further wherein the first seal ring includes, an upstream surface extending from the inner surface of the first seal ring, wherein the upstream surface at least partially defines the seal fluid passageway, an annular obstruction extending from the upstream surface of the first seal ring into the seal fluid passageway, wherein the annular obstruction is spaced apart from the inner surface of the first seal ring, and a plurality of slots formed in an upstream face of the annular obstruction, wherein the plurality of slots are angled relative to the inner surface of the first seal ring, and a depth of each slot of the plurality of slots is less than a thickness of the annular obstruction.

7. The seal system of claim 6, wherein an area of the seal fluid passageway adjacent the first seal ring defines an entrance region for the radial gap, and further wherein the annular obstruction is positioned proximate the entrance region.

8. The seal system of claim 6, wherein the annular obstruction maintains a positive differential pressure in the seal fluid passageway proximate the radial gap.

9. The seal system of claim 6, wherein the annular obstruction is an annular rib.

* * * * *